United States Patent
Matus

(10) Patent No.: US 9,926,077 B2
(45) Date of Patent: Mar. 27, 2018

(54) MODULAR ARMS ON A ROTOR-BASED REMOTE VEHICLE

(71) Applicant: Teal Drones, Inc., Salt Lake City, UT (US)

(72) Inventor: George Michael Matus, Salt Lake City, UT (US)

(73) Assignee: TEAL DRONES, INC., Salt Lake City, UT (US)

( * ) Notice: Subject to any disclaimer, the term of this patent is extended or adjusted under 35 U.S.C. 154(b) by 0 days.

(21) Appl. No.: 15/190,928

(22) Filed: Jun. 23, 2016

(65) Prior Publication Data
US 2017/0015418 A1 Jan. 19, 2017

Related U.S. Application Data

(60) Provisional application No. 62/193,816, filed on Jul. 17, 2015.

(51) Int. Cl.
*B64C 39/02* (2006.01)
*B64C 27/20* (2006.01)

(52) U.S. Cl.
CPC ...... *B64C 39/024* (2013.01); *B64C 2201/027* (2013.01); *B64C 2201/042* (2013.01); *B64C 2201/108* (2013.01); *B64C 2201/141* (2013.01); *B64C 2201/145* (2013.01); *B64C 2211/00* (2013.01)

(58) Field of Classification Search
CPC ... B64C 39/02; B64C 39/024; B64C 2211/00; B64C 2201/027; B64C 2201/042; B64C 2201/108; B64C 2201/141; B64C 2201/145

USPC .......................................................... 701/3
See application file for complete search history.

(56) References Cited

U.S. PATENT DOCUMENTS

| | | | | |
|---|---|---|---|---|
| 2007/0298935 A1* | 12/2007 | Badarneh | ............. | A63B 22/001 482/52 |
| 2008/0067960 A1* | 3/2008 | Maeda | ................... | B62D 5/046 318/400.02 |
| 2011/0139923 A1* | 6/2011 | Papanikolopoulos | . | A63H 27/12 244/2 |
| 2012/0215358 A1* | 8/2012 | Gettings | .................. | B25J 5/005 700/259 |
| 2014/0099853 A1* | 4/2014 | Condon | ............... | G05D 1/0033 446/37 |

(Continued)

*Primary Examiner* — Atul Trivedi
(74) *Attorney, Agent, or Firm* — Workman Nydegger

(57) ABSTRACT

A rotor-based remote flying vehicle platform includes a vehicle body. The vehicle body includes a processing unit that receives positional sensor data and provides flight controls based upon the received positional sensor data. The vehicle body also includes a first frame connection interface that is configured to interface with a plurality of different arm types. The first frame connection interface comprises a physical connection and an electronic connection. Additionally, the rotor-based remote flying vehicle platform includes a first arm, of a rotor-based remote flying vehicle platform, that is selectively connectable to the vehicle body through the first frame connection interface. The first arm comprises a first arm connection interface that is selectively connectable to the first frame connection interface. Additionally, the first arm comprises a first motor mounted to the first arm.

18 Claims, 6 Drawing Sheets

(56) References Cited

U.S. PATENT DOCUMENTS

| | | | |
|---|---|---|---|
| 2015/0120094 A1* | 4/2015 | Kimchi | B64C 39/024 |
| | | | 701/3 |
| 2016/0244950 A1* | 8/2016 | Kami | E02F 9/2033 |
| 2017/0006340 A1* | 1/2017 | Enke | H04N 21/440281 |

* cited by examiner

MODULAR ARMS ON A ROTOR-BASED REMOTE VEHICLE

CROSS-REFERENCE TO RELATED APPLICATIONS

This application claims the benefit of and priority to U.S. Provisional Patent Application Ser. No. 62/193,816 filed on 17 Jul. 2015 and entitled "MODULAR ARMS ON A ROTOR-BASED REMOTE VEHICLE," which application is expressly incorporated herein by reference in its entirety.

BACKGROUND

After being used in military application for some time, so called "drones" have experienced a significant increase in public use and interest in recent years. The proposed uses for drones has rapidly expanded to include everything from package delivery to mapping and surveillance. The wide-ranging uses for drones has also created a wide assortment of different drone configurations and models. For example, some drones are physically better suited to travelling at high speed, while other drones are physically better suited for travelling long distances.

Conventional drones typically fall within two different categories—fixed-wing drones and rotor-based drones. Rotor-based drones may comprise any number of different rotors, but a common rotor configuration comprises four separate rotors. Rotor-based drones provide several benefits over fixed-wing drones. For example, rotor-based drones do not require a runway to take-off and land. Additionally, rotor-based drones can hover over a position, and in general are typically more maneuverable. Also, rotor-based drones are significantly more capable of flying within buildings and other structures.

Several technical limitations have slowed the wide-spread use and adoption of rotor-based drones. These technical limitations include insufficient control systems for achieving and maintaining flight stability, deficient sensors for accurately obtaining positional data for the rotor-based drones, and high-power usage that both limited the flight time of rotor-based drones and increased their weight from batteries. The increased use of rotor-based drones has presented a need for greater flexibility within individual rotor-based drone systems that address one or more of these technical limitations. As such, there are several problems in the art to be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise systems, methods, and apparatus configured to provide a highly configurable rotor-based remote flying vehicle platform. In particular, disclosed embodiments comprise rotor-based remote flying vehicle platforms with interchangeable arms. The various interchangeable arms comprise different purposes, different optimizations, different sensors, different motors, and other such different configurations. As such, a user can quickly and easily configure a rotor-based remote flying vehicle platform to a particular need by simply interchanging a first set of arms for a second set of arms.

Disclosed embodiments comprise a rotor-based remote flying vehicle platform. The rotor-based remote flying vehicle platform includes a vehicle body. The vehicle body includes a processing unit that receives positional sensor data and provides flight controls based upon the received positional sensor data. The vehicle body also includes a first frame connection interface that is configured to interface with a plurality of different arm types. The first frame connection interface comprises a physical connection and an electronic connection.

Additionally, disclosed embodiments include a first arm, of a rotor-based remote flying vehicle platform, that is selectively connectable to the vehicle body through the first frame connection interface. The first arm comprises a first arm connection interface that is selectively connectable to the first frame connection interface. Additionally, the first arm comprises a first motor mounted to the first arm.

Further disclosed embodiments include a method for customizing a rotor-based remote flying vehicle platform. The method comprises receiving, at a processing unit associated with a vehicle body, a first indication that a first arm has been removed from a first frame connection interface. The first indication comprises data describing one or more operating characteristics of a first motor mounted to the first arm. The method also comprises receiving, at the processing unit associated with the vehicle body, a second indication that a second arm has been connection to the first frame connection interface. The second indication comprises data describing one or more operating characteristics of a second motor mounted to the second arm. Additionally, the second motor is a different type of motor than the first motor and is associated with different operating characteristics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Disclosed embodiments extend to systems, methods, and apparatus configured to provide a highly configurable rotor-based remote flying vehicle platform. In particular, disclosed embodiments comprise rotor-based remote flying vehicle platforms with interchangeable arms. The various interchangeable arms comprise different purposes, different optimizations, different sensors, different motors, and other such different configurations. As such, a user can quickly and easily configure a rotor-based remote flying vehicle platform to a particular need by simply interchanging a first set of arms for a second set of arms.

Accordingly, disclosed embodiments allow a rotor-based remote flying vehicle platform to be used in a wide variety of different situations and environments. Additionally, disclosed embodiments allow a rotor-based remote flying vehicle platform to be easily upgraded and extended to include functions and features that are tailored for specific situations. For example, embodiments of the present invention can comprise interchangeable arms that are uniquely configured. As such, a user can customize a rotor-based remote flying vehicle platform by simply connecting desired arms to the rotor-based remote flying vehicle platform.

In the following disclosure various exemplary embodiments of the present invention are recited. One will understand that these examples are provides only for the sake of clarity and explanation and do not limit or otherwise confine the invention to the disclosed examples. Additionally, one or more of the following examples is provided with respect to a "quadrotor." One will understand that the usage of a "quadrotor" is merely for the sake of clarity and that the present invention applies equally to all rotor-based remote flying vehicle platforms regardless of the number of rotors.

Figure 1:
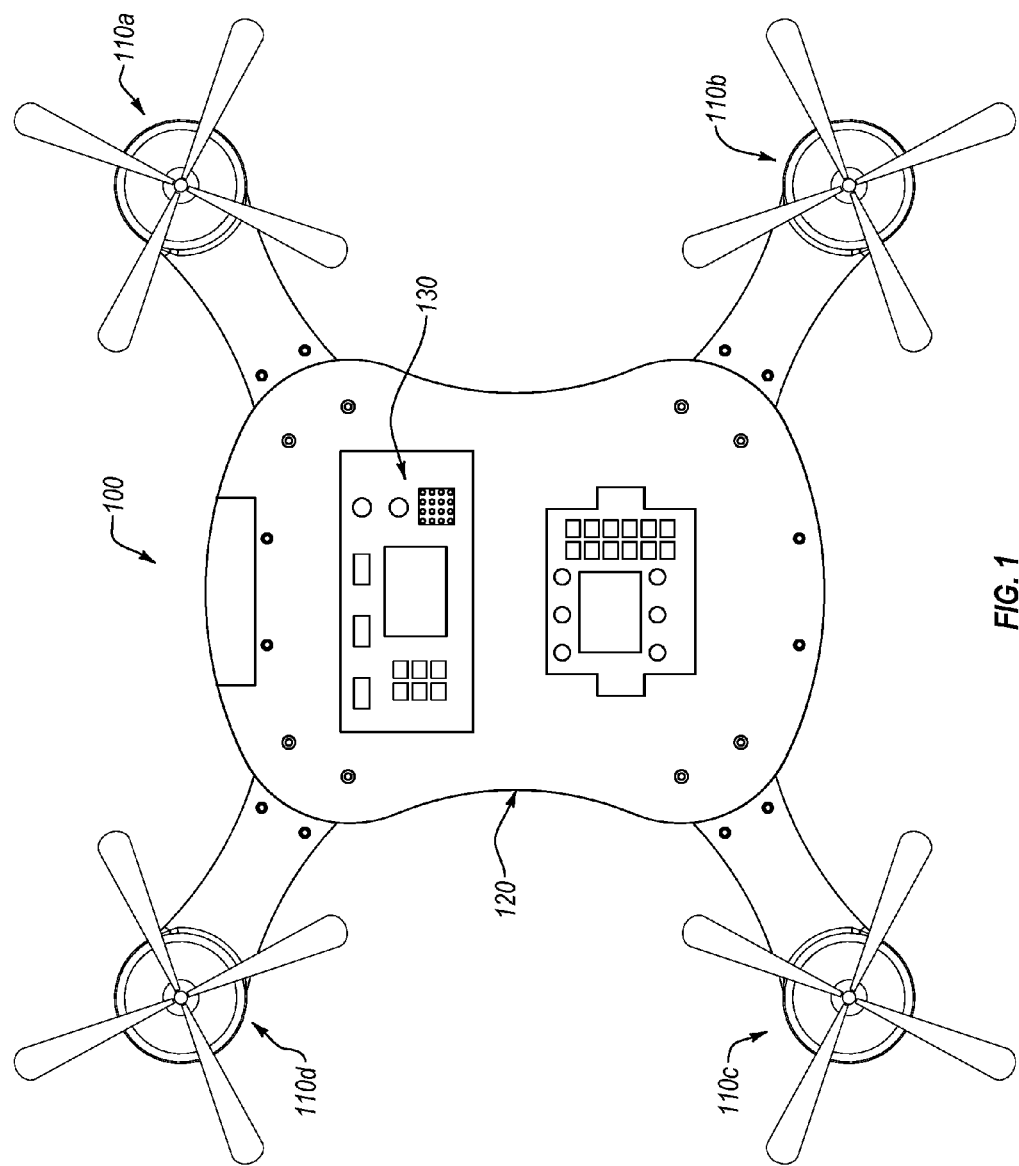
FIG. 1 illustrates an embodiment of a quadrotor with modular arms.

Turning to the figures, FIG. 1 illustrates a quadrotor 100 with modular arms 110(a-d) in accordance with embodiments of the present invention. In particular, the depicted quadrotor 100 comprises multiple arms 110(a-d) attached to a vehicle body 120. Additionally, the depicted quadrotor 100 comprises a processing unit in the form of flight control unit 130 within the vehicle body 120. The flight control unit 130 comprises sensors for controlling the quadrotor (e.g., altimeter, gyroscopes, GPS, sonar, etc.), along with various control and processing modules (e.g., CPU, radio, antenna, GPU, etc.) In at least one additional or alternative embodiment, the flight control unit 130 and/or associated sensors are otherwise located or dispersed through the quadrotor 100.

As such, the processing unit receives positional sensor data and provides flight controls based upon the received positional sensor data. For example, in at least one embodiment, the processing unit receives data from gyroscopes and accelerometers. Using the received sensor information, the processing unit controls the flight of the quadrotor using a control system, such as a PID loop.

As stated above, one will understand that the depicted quadrotor 100 is merely exemplary. Additional or alternate embodiments of the present invention may comprise rotor-based remote flight systems with less than four arms 110(a-d) or rotor-based remote flight systems with more than four arms 110(a-d). Additionally, various embodiments of the present invention may comprise different physical configurations, construction materials, proportions, and functional components. For instance, rotor-based remote flight platforms may comprise a mixture of components such as cameras, sonars, laser sights, GPS, various different communication systems, and other such variations.

Figure 2:
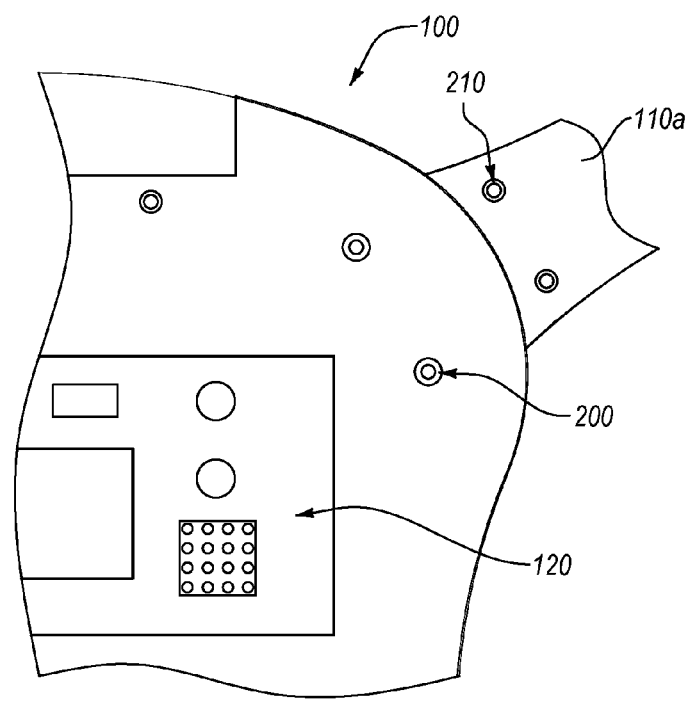
FIG. 2 illustrates a close-up view of an embodiment of an arm-to-frame connection of the quadrotor of FIG. 1.

In at least one embodiment of the present invention, the arms 110(a-d) of the quadrotor 100 are selectively removable and reconfigurable. For example, FIG. 2 illustrates a close-up view of an arm-to-frame connection of the quadrotor shown in FIG. 1. In particular, FIG. 2 depicts a first arm 110a connected to the vehicle body 120 of the quadrotor 100. Additionally, a frame connector 200 and an arm connector 210 are also depicted. The respective frame connector 200 and arm connector 210 may comprise any of a number of different connector types, including, but not limited to, a screw, a bolt, a mechanical clip, a mechanical button, or any other connector configured to selectively couple two physical structures. In particular, in at least one embodiment, the respective frame connector 200 and arm connectors 210 comprise portions of an integrated connector, such as a snap-fit, that allows a user to selectively attached an arm 110 to a vehicle body 120 without removing, or otherwise, directly manipulating a connector. Instead, a forceful pull or push may be sufficient to remove and attach an arm 110.

Figure 3:
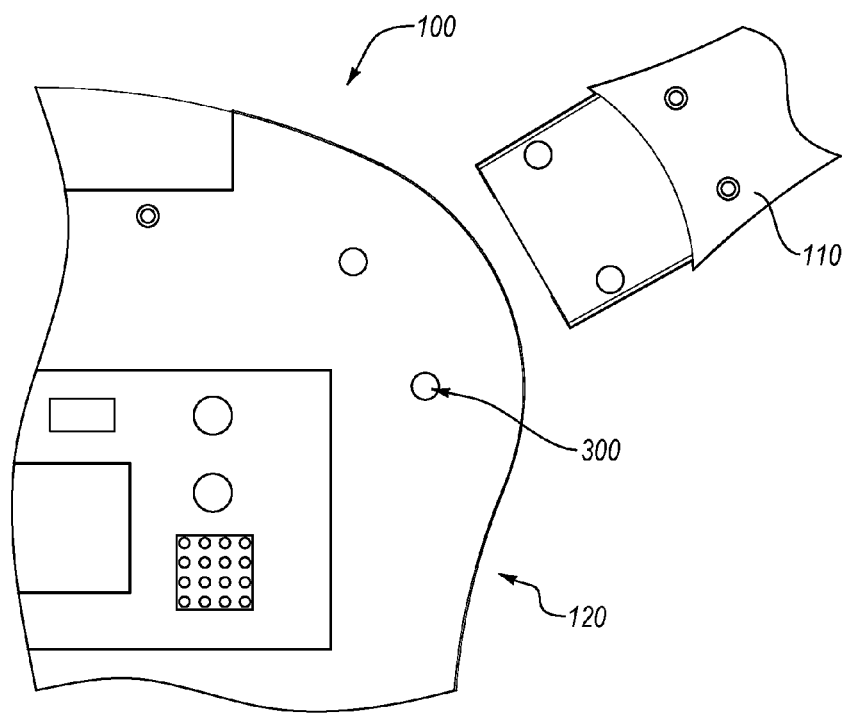
FIG. 3 illustrates another close-up view of an embodiment of the arm-to-frame connection of the quadrotor of FIG. 1.

FIG. 3 illustrates another close-up view of an arm-to-frame connection of the quadrotor 100 depicted in Figure. In FIG. 3, the frame connector 200 has been removed to reveal a frame connector hole 300. Once the frame connector 200 has been removed, the arm 110 can be easily removed physically from the vehicle body 120 of the quadrotor 100. As stated above, in at least one embodiment, it may not be necessary to remove a connector 200 from the quadrotor prior to removing an arm 110. For example, the quadrotor 100 may comprise a button that can be pushed to disengage an arm 110 from the vehicle body 120. Additionally, in at least one embodiment, the arm 110 may be connected to the vehicle body 120 through a pressure-fit or snap-fit connection that can be overcome with force.

Figure 4:
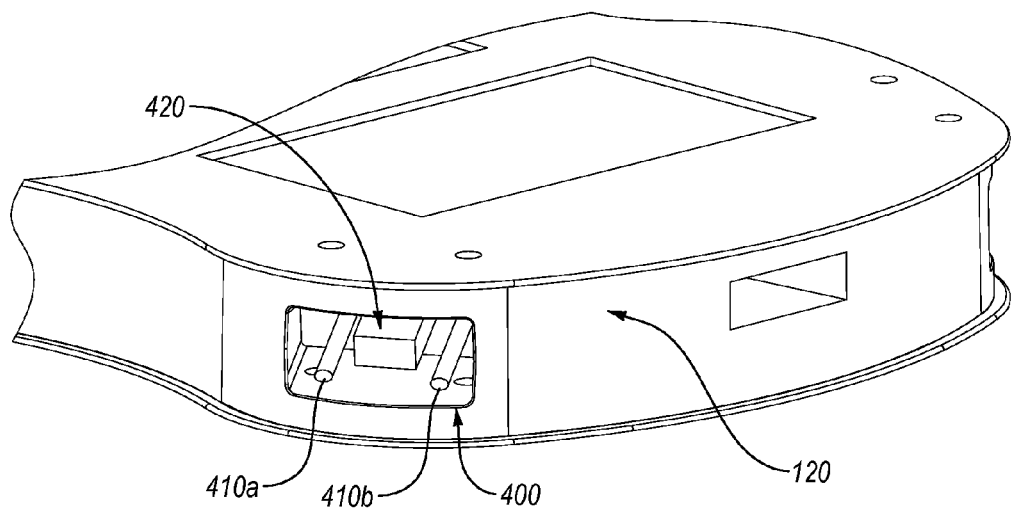
FIG. 4 illustrates a close-up view of an embodiment of a frame connection interface.

Turning now to FIG. 4, FIG. 4 illustrates a close-up view of a frame connection interface 400. The frame connection interface 400 comprises both the physical connection described in FIG. 2 and FIG. 3 and electronic connections, such as a first power connection interface 410a, a second power connection interface 410b, and a frame data connection interface 420. Accordingly, in at least one additional or alternative embodiment, the frame connection interface 400 provides an interface for connecting a variety of different arms, and accompanying accessories, to the vehicle body 120.

In various embodiments, the frame connection interface 400 provides an extensible platform for interchanging different arms 110 with a particular quadrotor 100. In particular, the frame connection interface 400 may be configured to provide positive and negative power 410a, 410b to arm 110 and also to provide a communication channel 420 to the arm 110. As such, a replacement arm may comprise a different motor, different physical materials, a different length, additional sensors or other accessories, or any number of other difference from the original arm 110.

Figure 5:
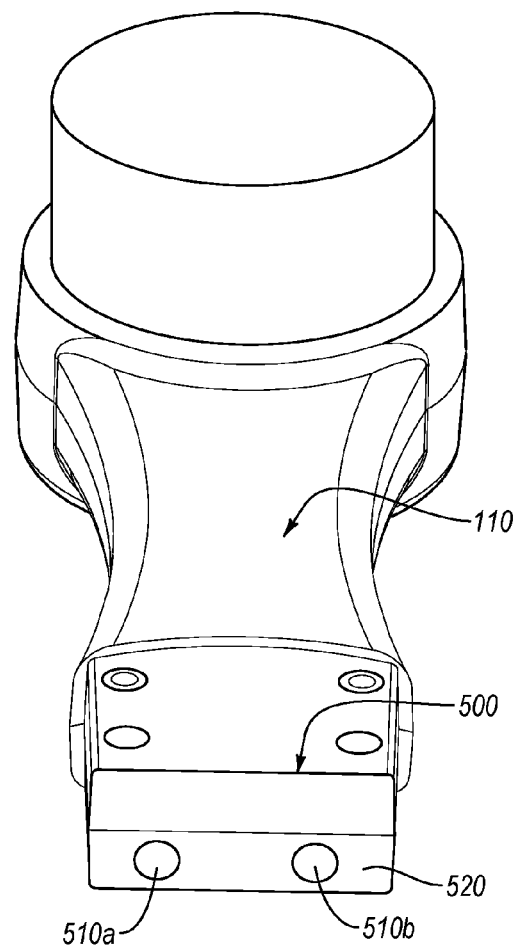
FIG. 5 illustrates a close-up view of an embodiment of an arm connection interface.

FIG. 5 illustrates a close-up view of an arm connection interface 500 in accordance with embodiments of the present invention. Similar to the frame connection interface 400, the arm connection interface 500 comprises a first power connection receiver 510a, a second power connection receiver 510b, and an arm data connection interface 520. In at least one embodiment, the various connection interfaces 510a, 510b, 520 are integrated into a single connection interface. Similarly, in at least one embodiment, the connection interfaces 510a, 510b, 520 can be further divided than those depicted. For example, the arm data connection interface 520 may be further divided into a motor-control connection (not shown) portion for communicating control signals to a motor or motor controller and a sensor connection (not shown) for communicating with a sensor disposed on the arm.

In at least one embodiment, the respective frame connection interface 400 and arm connection interface 500 are selectively connectable to each other. As used herein, two objects are selectively connectable when they are configured to be attached and removed from each other during the normal course of use. As such, the respective frame connection interface 400 and arm connection interface 500 allow a quadrotor 100 to be quickly and easily customized for a particular job. For example, when outfitting a quadrotor for endurance flying, it may be beneficial for the quadrotor 100 to comprise long arms 110(a-d) with specially tuned motors. In contrast, when outfitting a quadrotor 100 for short, high-speed, high agility flights, it may be beneficial for the quadrotor to comprise short arms 110(a-d) with high output motors. Accordingly, in at least one embodiment, the frame connection interface 400 and the arm connection interface 500 allow a quadrotor 100 to be easily and quickly customized by simply interchanging between various alternate arms, such as an endurance-based arm 110 with a speed-based arm 110.

Additionally, in various embodiments, it may be desirable to add functionality to a quadrotor 100 by interchanging various arms 110(a-d) of the quadrotor 100. For example, a quadrotor 100 may be able to gain GPS functionality by adding an arm 110 with an integrated GPS chip. The GPS chip within the arm 110 may be configured to communicate with the flight control unit 130 through the frame data connection interface 420 and the arm data connection interface 520. In at least one embodiment, the respective data connection interfaces 420, 520 may comprise a plug-and-play functionality. For instance, the data connection interfaces 420, 520 may comprise a USB controller configured to facilitate communications between modules within the arm 110 and the flight control unit 130.

As an addition example, it may be desirable to add a video camera function to a quadrotor 100 the otherwise lacks a camera. As such, one or more modular arms 110(a-d) with incorporated cameras can be added to the quadrotor 100. As mentioned above, in at least one embodiment, the cameras comprise USB compatible cameras. Upon connecting the frame connection interface 400 to the arm connection interface 400, the flight control unit 130 automatically detects and configured the respective USB cameras. Additionally, in at least one embodiment, the flight control unit 130 provides a remote user with access to the respective cameras. For instance, the flight control unit 130 may comprise a radio transmitter that can transmit the camera data to the remote user.

In at least one embodiment, the flight control unit 130 comprises a database of information relating to potential arm configurations that can be attached to the quadrotor 100. In particular, the database comprises operating configurations associated with each arm configuration. For example, a particular arm 110 may comprise a sonar for additional flight control input. The database comprises information necessary for flight control unit 130 to access the sonar data, interpret the sonar data, and utilize the sonar data within flight calculations. For instance, in at least one embodiment, the database may also comprise information necessary for the flight control unit to utilize the sonar data within a Kalman filter.

Additionally, in at least one embodiment, the database may comprise information relating to the flight dynamics of a particular arm 110. For example, the database may comprise appropriate PID values for stable flight with a wide variety of different arms. As stated above, various arms 110 may comprise different lengths, different materials, different types of motors, different shapes, and a myriad of other distinctions. For example, in at least one embodiment, a first arm comprises a high-speed motor and the first arm is constructed from a carbon fiber material. In contrast, a second arm comprises a heavy-lift motor and the second arm is constructed of high-strength aluminum. One will understand that each of these differences can dramatically influence flight dynamics. As such, the database can provide proper flight control values for each different arm configuration.

Further, in at least one embodiment, the database can comprise proper values for a wide array of different arm configurations 110. For example, a particular quadrotor 100 may comprise arms 110(a-d) of different types and configurations. In at least one embodiment, the database comprises information relating to the flight dynamics of a variety of different and non-uniform arm configurations such that a user can mix-and-match the arms 110(a-d) on a quadrotor 100 and automatically achieve desirable flight dynamics.

Additionally, in at least one embodiment, each arm 110 (a-d) may also comprise a memory module that stores information specific to the arm 110. For example, a particular memory module associated with an arm 110 may comprise control system values that can enable a flight control unit 130 to maintain flight stability when using the arm. Additionally, a memory module associated with an arm 110 may comprise information required for a flight controller 130 to control and access sensors and other components integrated into a particular arm 110. As such, in at least one embodiment, a flight controller 130 can automatically incorporate any number of different arm configurations based upon information stored within an onboard database and/or information stored within each arm 110(a-d).

Figure 6A:
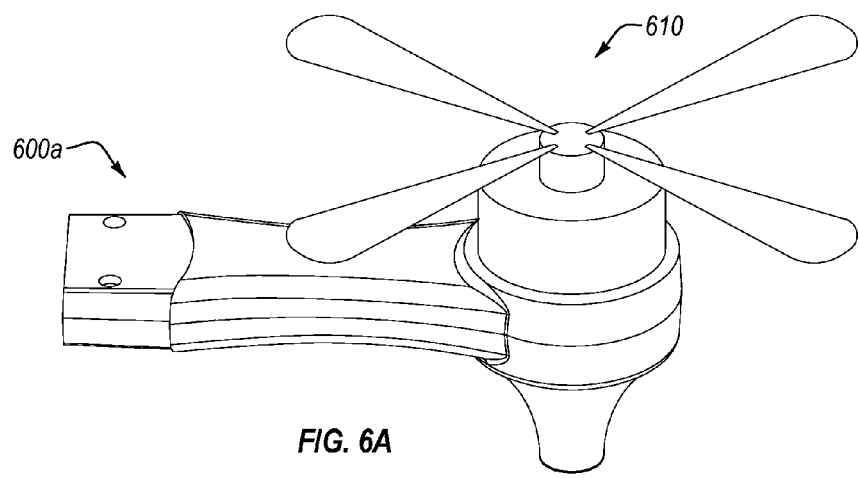
FIG. 6A illustrates an embodiment of a quadrotor arm.

Turning now to various exemplary embodiments of modular arms for a rotor-based remote flying vehicle platform, FIGS. 6A-6F illustrate various different embodiments and/or configurations of respective modular arms. In particular, FIG. 6A depicts a modular arm 600a that comprises a motor 610 and associated propellers. In at least one embodiment, modular arm 600a is used for standard flight conditions that do not require abnormal speed, load-bearing capacity, endurance, or other specific requirements.

Figure 6B:
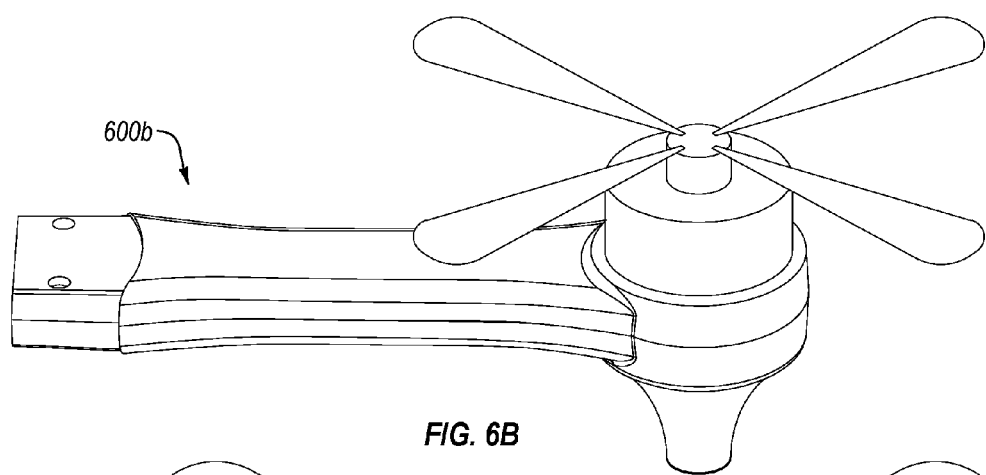
FIG. 6B illustrates another embodiment of a quadrotor arm.

In contrast, the modular arm 600b, depicted in FIG. 6B, comprises an increased length compared to modular arm 600a. One of skill in the art will understand that increased arm length impacts the flight dynamics of an associated quadrotor in various foreseeable ways. For example, the longer modular arm 600b may increase the stability of a quadrotor while in flight. As such, a user may desire to use the longer modular arm 600b during windy conditions.

Figure 6C:
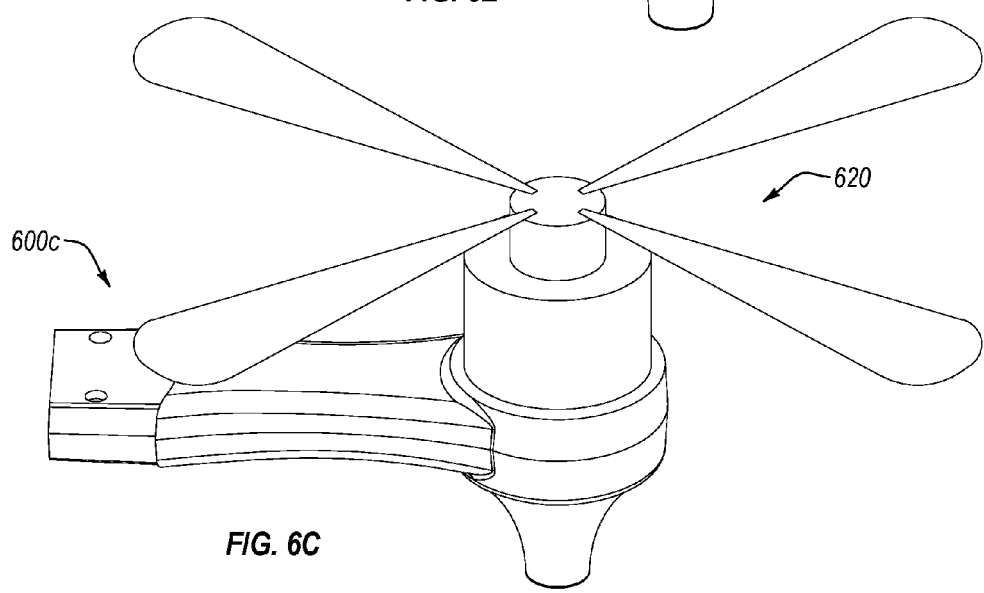
FIG. 6C illustrates another embodiment of a quadrotor arm.

Modular arm 600c, depicted in FIG. 6C, comprises a different motor and propeller type than the motor and propeller configuration of FIGS. 6A and 6B. Specifically, motor 620 is larger than motor 610. In at least one embodiment, the larger motor 620 provides greater thrust than motor 610. Accordingly, a user may utilize modular arm 600c when performing high-speed flight or other similar tasks.

Figure 6D:
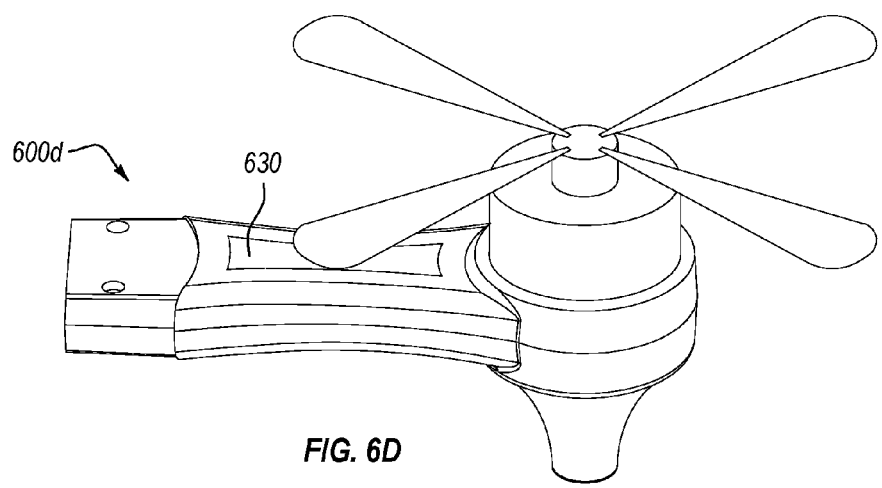
FIG. 6D illustrates another embodiment of a quadrotor arm.

FIG. 6D illustrates a modular arm 600d that comprises a different material and structural configuration than the previously disclosed modular arms 600a, 600b, 600c. For example, modular arm 600d comprises a cut-out portion 630 that is configured to decrease the weight of the modular arm 600d. Additionally, the modular arm 600d is constructed of a light material such as carbon fiber. As such, modular arm 600d comprises a significantly lower weight than the previously disclosed modular arms 600a, 600b, 600c. A user may desire to use modular 600c when performing endurance flights that are influenced by the weight of the quad rotor.

Figure 6E:
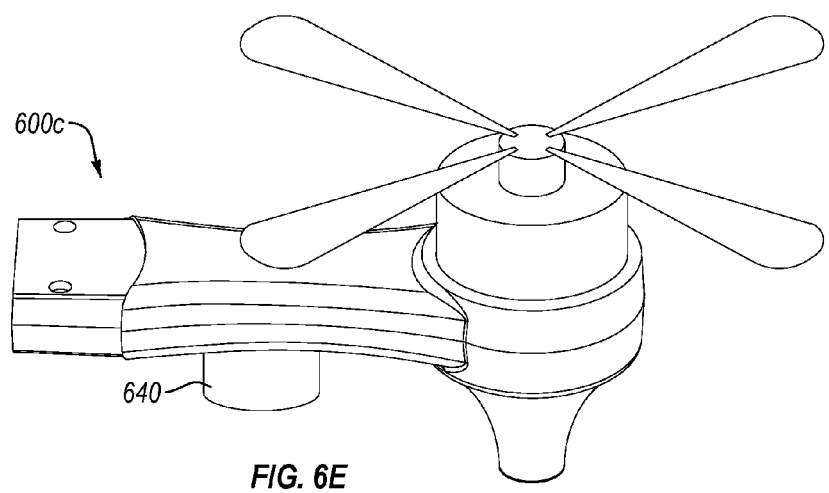
FIG. 6E illustrates another embodiment of a quadrotor arm.

FIG. 6E depicts an additional embodiment of a modular arm 600c that comprises a sensor 640. In the depicted embodiment, the sensor 640 comprises a sonar; however, in various additional or alternative embodiments any number of different sensors may be used, such as a GPS, an altimeter, a gyroscope, an accelerometer, a camera, a lidar, a Bluetooth module, a Wi-Fi module, or any other sensor device. Similarly, a modular arm 600c may comprise a communication unit such as an analog receiver or transmitter, a video signal receiver or transmitter, a virtual reality video stream receiver or transmitter, or similar communication component.

In at least one embodiment, when attaching modular arm 600e to a quadrotor vehicle body, electronic components within modular arm 600e communicate to a processing unit within the vehicle body. In particular, the modular arms communicates data that describes the various characteristics of the modular arm 600e. For example, the modular arm 600e communicates to the processing unit the motor flight characteristics and characteristics relating to electronic devices embedded within the modular arms, such as sensors 640.

Figure 6F:
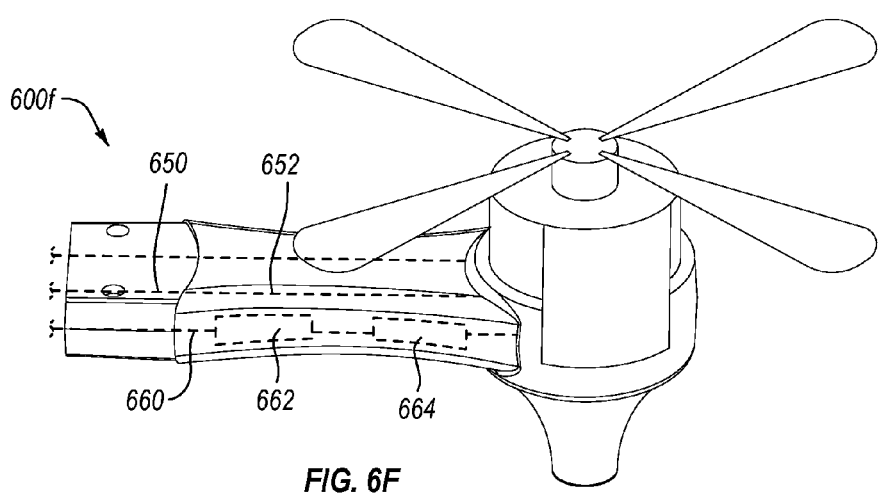
FIG. 6F illustrates another embodiment of a quadrotor arm.

FIG. 6F illustrates a cutaway modular arm 600f that depicts internal electronics 650, 652, 660, 662, 640 within the modular arm 600f. In particular, module arm 600f comprises a positive and negative power channel 650, 652 and an electronic connection 660. The electronic connection 660 is configured to communicate to electronics within the modular arm 600e. For example, the electronic connection 660 may comprise a motor-control connection portion for communicating control signals to a motor or motor controller 664 (e.g., electronic speed controller) and a sensor connection portion for communicating with an identification component 662. The identification component 662 may comprise a micro-controller, a processor, an ASIC, an FPGA, or any other electronic device capable of executing instructions.

In at least one embodiment, when modular arm 600f is connected to a rotor-based remote flying vehicle body, the identification component 662 communicates various identification data to the control unit 130 within the vehicle body 120 (shown in FIG. 1). For example, the identification component 662 communicates flight dynamics data to the control unit 130 for inclusion into the control system. For instance, the flight dynamics data may comprise identification data necessary for calculating PID values for stable flight with modular arm 600f.

Additionally, the identification component 662 is also capable of communicating identification data relating to the electronics components within the modular arm 600f, such as sensors 640. For example, the identification component 662 may communicate specifications and communication parameters about the sonar (sensor 640) to the control unit 130. In particular, the identification component 662 may communicate sufficient information for the control unit 130 to incorporate the sonar into the control system for the vehicle. For instance, the control unit 130 may incorporate identification data from the sonar into a Kalman filter that is used to control the rotor-based remote flying vehicle.

Accordingly, in various different or additional embodiments, a wide variety of different modular arms with different configurations and features can be easily interchanged within the same rotor-based remote flying vehicle. Further, in at least one embodiment, the rotor-based remote flying vehicle comprises modular arms of various different types. For example, a first modular arm may comprise an additional GPS sensor, while a second modular arm comprises a camera. Both the first and second modular arm will impact the quadrotor differently and require different identification data to be sent from a respective identifier component.

One will appreciate that embodiments disclosed herein can also be described in terms of flowcharts comprising one or more acts for accomplishing a particular result. For example, FIG. 7 and the corresponding text describe acts in various methods and systems for customizing a rotor-based remote flying vehicle platform. The acts of FIG. 7 are described below.

Figure 7:
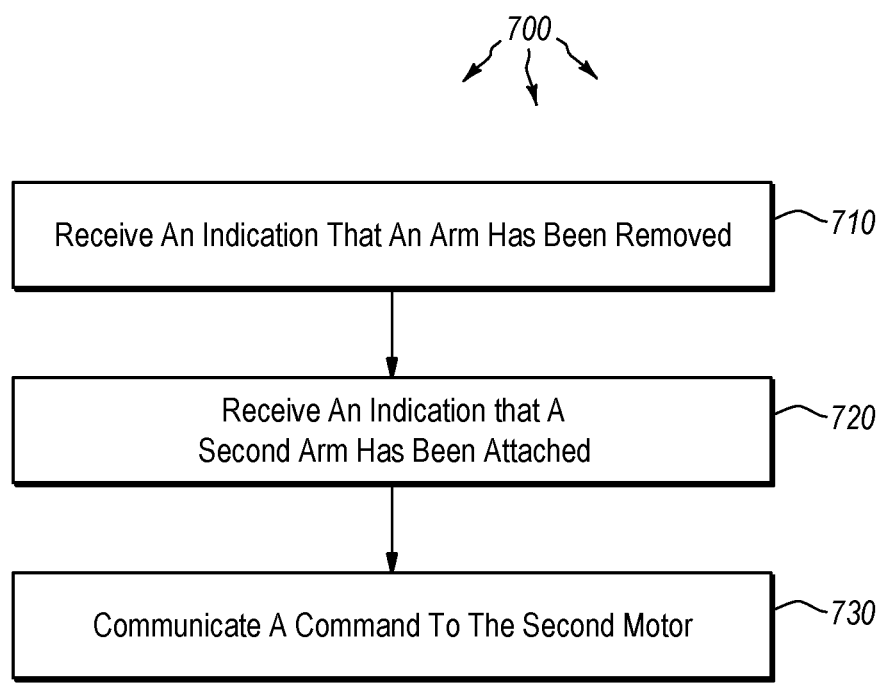
FIG. 7 illustrates a flowchart for an embodiment of a method for customizing a rotor-based remote flying vehicle platform.

For example, FIG. 7 illustrates that a flowchart for an embodiment of a method 700 for customizing a rotor-based remote flying vehicle platform can comprise an act 710 of receiving an indication that an arm has been removed. Act 710 includes receiving, at a processing unit associated with a vehicle body, a first indication that a first arm has been removed from a first frame connection interface. The first indication comprises data describing one or more operating characteristics of a first motor mounted to the first arm. For example, as depicted and described with respect to FIG. 6F, when a modular arm is removed from a vehicle body, the control unit 130 detects a break in communication with the identification component 662.

FIG. 7 also illustrates that the method 700 comprises an act 720 of receiving an indication that a second arm has been attached. Act 720 includes receiving, at the processing unit associated with the vehicle body, a second indication that a second arm has been connection to the first frame connection interface. The second indication comprises data describing one or more operating characteristics of a second motor mounted to the second arm, wherein the second motor is a different type of motor than the first motor and is associated with different operating characteristics. For example, as depicted and described with respect to FIG. 6F, when a modular arm is connected to a vehicle body, the identification component 662 communicates to the control unit 130 data describing the motor characteristics and various other characteristics of sensors and components within the modular arm.

Additionally, FIG. 7 illustrates that the method comprises an act 730 of communicating a command to the second motor. Act 730 includes communicating a command from the processing unit to the second motor, wherein one or more aspects of the command are determined by the data. For example, as depicted and described with respect to FIG. 6F, the control unit 130 communicates flight control commands to the motor controller 664 based upon the vehicles control system.

Accordingly, in at least one embodiment, a quadrotor can be quickly and easily modified to incorporate any number of different features and provide a remote user with accessing control over those features.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A rotor-based remote flying vehicle platform comprising:
   a vehicle body, wherein the vehicle body comprises:
      a processing unit that receives positional sensor data and provides flight controls based upon the received positional sensor data, and
      a first frame connection interface that is configured to interface with a plurality of different arm types, wherein the first frame connection interface comprises a physical connection and an electronic connection;
   a first arm that is selectively connectable to the vehicle body through the first frame connection interface, wherein the first arm comprises:
      a first arm connection interface that is selectively connectable to the first frame connection interface, and
      a first motor mounted to the first arm; and
   an alternate arm that is selectively connectable to the vehicle body, wherein the alternate arm comprises an alternate arm connection interface that is selectively connectable to the first frame connection interface, and wherein the alternate arm comprises an alternate motor that is different type of motor than the first motor.

2. The rotor-based remote flying vehicle platform as recited in claim 1, wherein the alternate arm comprises a different length than the first arm.

3. The rotor-based remote flying vehicle platform as recited in claim 1, wherein the alternate arm comprises a different material than the first arm.

4. The rotor-based remote flying vehicle platform as recited in claim 1, wherein the alternate arm comprises a sensor module that is not present within the first arm.

5. The rotor-based remote flying vehicle platform as recited in claim 1, wherein the electronic connection comprises a power connection portion for providing power to the first motor.

6. The rotor-based remote flying vehicle platform as recited in claim 1, wherein the electronic connection comprises a motor-control connection portion for communicating control signals to a motor or motor controller.

7. The rotor-based remote flying vehicle platform as recited in claim 1, wherein the electronic connection comprises a sensor connection portion for communicating with a sensor disposed on the first arm.

8. The rotor-based remote flying vehicle platform as recited in claim 1, further comprising a second arm with an associated second motor, a third arm with an associated third motor, and a fourth arm with an associated fourth motor, wherein each of the first arm, second arm, third arm, and fourth arm are selectively replaceable with a different type of arm.

9. A rotor-based remote flying vehicle platform comprising:
   a first arm that is selectively connectable to a vehicle body through a first frame connection interface, wherein the first arm comprises:
      a first arm connection interface that is configured to physically attach to the first frame connection interface and to electronically communicate through the first frame connection interface,
      a first motor mounted to the first arm, and
      a first identification component that communicates first identification information relating to the first motor to a processing unit associated with the vehicle body.

10. The rotor-based remote flying vehicle platform as recited in claim 9, further comprising:
    the vehicle body, wherein the vehicle body comprises:
       the processing unit that receives positional sensor data and provides flight controls based upon the received positional sensor data, and
       the first frame connection interface that is configured to interface with a plurality of different arm types, wherein the first frame connection interface comprises a physical connection and an electronic connection.

11. The rotor-based remote flying vehicle platform as recited in claim 9, wherein the first identification information also comprises information that corresponds to a length of the first arm.

12. The rotor-based remote flying vehicle platform as recited in claim 9, wherein the first identification information also comprises information that describes a type of motor of the first motor.

13. The rotor-based remote flying vehicle platform as recited in claim 9, wherein the first identification information also comprises information that corresponds with a type of material of the first arm.

14. The rotor-based remote flying vehicle platform as recited in claim 9, wherein the first arm comprises a sensor.

15. The rotor-based remote flying vehicle platform as recited in claim 14, wherein the first identification information also comprises information that relates to the sensor.

16. The rotor-based remote flying vehicle platform as recited in claim 9, further comprising a second arm with an associated second motor, a third arm with an associated third motor, and a fourth arm with an associated fourth motor, wherein each of the first arm, second arm, third arm, and fourth arm are selectively replaceable with a different type of arm.

17. The rotor-based remote flying vehicle platform as recited in claim 9, further comprising:
    an alternate arm that is selectively connectable to the vehicle body through the first frame connection interface, wherein the alternate arm comprises:
       an alternate arm connection interface that is configured to physically attach to the first frame connection interface and to electronically communicate through the first frame connection interface, an alternate motor mounted to the alternate arm, wherein the alternate motor is a different type of motor than the first motor, and an alternate identification component that communicates alternate identification information relating to the alternate motor to the processing unit associated with the vehicle body.

18. A method for customizing a rotor-based remote flying vehicle platform comprising:

receiving, at a processing unit associated with a vehicle body, a first indication that a first arm has been removed from a first frame connection interface;

receiving, at the processing unit associated with the vehicle body, a second indication that a second arm has been connected to the first frame connection interface, wherein the second indication comprises:

data describing one or more operating characteristics of a second motor mounted to the second arm, wherein the second motor is a different type of motor than the first motor and is associated with different operating characteristics; and communicating a command from the processing unit to the second motor, wherein one or more aspects of the command are determined by the data.

\* \* \* \* \*